No. 693,306. Patented Feb. 11, 1902.
J. PECKOVER.
STONE SAW.
(Application filed July 9, 1900. Renewed Jan. 9, 1902.)
(No Model.)
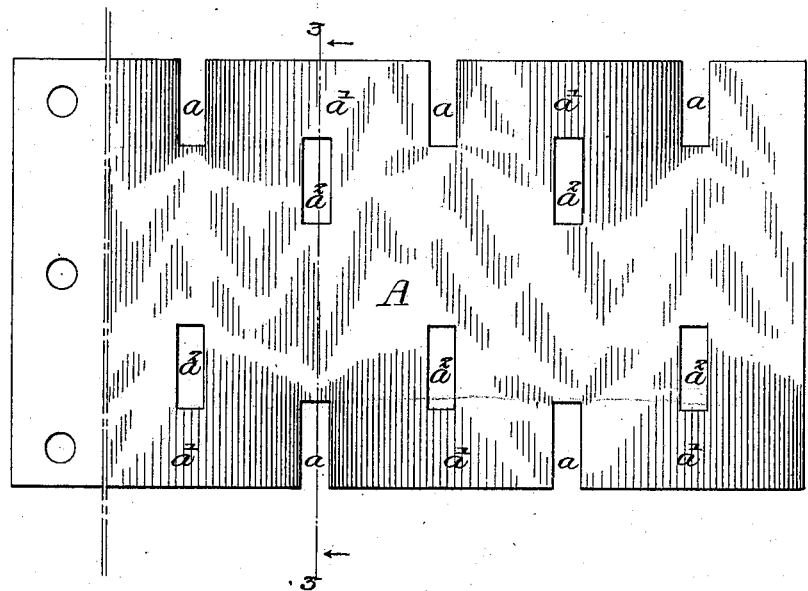
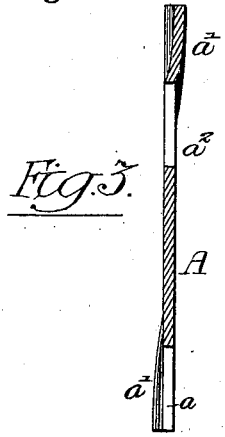
Witnesses:
Inventor:
James Peckover
by his Attorneys

UNITED STATES PATENT OFFICE.

JAMES PECKOVER, OF PHILADELPHIA, PENNSYLVANIA.

STONE-SAW.

SPECIFICATION forming part of Letters Patent No. 693,306, dated February 11, 1902.

Application filed July 9, 1900. Renewed January 9, 1902. Serial No. 89,069. (No model.)

*To all whom it may concern:*

Be it known that I, JAMES PECKOVER, residing at Philadelphia, State of Pennsylvania, have invented new and useful Improvements in Stone-Saws, of which the following is a specification.

This invention relates to certain improvements in saws for cutting stone, having for its object the provision of a saw which shall be efficient in operation, comparatively cheap to manufacture, and so constructed that it shall be in condition to give effective service until it is completely worn out. These objects I attain as hereinafter set forth, reference being had to the accompanying drawings, in which—

Figure 1 is a side view of one form of my improved saw. Fig. 2 is a plan view of the same; and Fig. 3 is a vertical sectional view on the line 3 3, Fig. 1.

As previously manufactured and used stone-saws have been constructed of a sheet or band of metal, with or without slots or recesses cut in them by means of which new teeth were formed as old ones wore away. The sheet of metal being in one plane, a slot or kerf was cut in the stone very little wider than the saw was thick, there being always considerable friction between the saw and the wall of said slot. Further, there being, as above stated, so little clearance for the saw-blade it was exceedingly difficult to retain the abrading material in the kerf, as the saw would eject a large proportion of it at each stroke. By my improved form of saw I am enabled to retain a very large proportion of the said abrading substance and to very materially reduce the friction between the saw and the walls of the slot in which it operates.

In the drawings, A is the body of a stone-saw, consisting of a plate of iron or steel having slots or recesses $a\ a$, preferably rectangular in outline, cut in its edges, thereby forming teeth $a'\ a'$. Opposite the center of each tooth and with its front end projecting slightly near the edge of the saw and the bottom of the slots $a$ are other slots $a^2\ a^2$, extending through the plate A, preferably of the same shape and dimensions as the recesses $a$. The other edge of the saw-blade is similarly provided with teeth, the saw being thus reversible in its frame when one edge has been worn down as far as allowable. From Fig. 2 it will be seen that the saw-teeth are bent into a series of wave-like or reverse curves or corrugations, the teeth being made alternately convex and concave when viewed from the side. When the first set of teeth have worn away, the next set are similarly bent, using for this purpose any convenient clamp or bending device. Holes $a^3$ are provided in each end of the saw for its attachment to the saw-frame, said attachment being made by bolts in the customary manner.

In operation as my improved saw is reciprocated in the kerf there is but very slight friction between it and the walls of the slot, since it contacts with them only tangentially on one vertical line on each tooth. Further, owing to the curved form of the teeth and to the fact that the saw itself is much thinner in section than the width of the kerf by far the greater proportion of the abrading material is retained within said kerf, the saw ejecting but very little of it at each stroke. By the use of a number of series of short rectangular slots cut in the saw-blade, as shown, instead of a number of long slots extending from the cutting edge back into the blade as far as it is to be used, I find that the stiffness, with consequent increased efficiency of action, is obtained. When the blade has been worn down on one edge as far as permissible, it is removed from its frame and reversed, the other edge then being available for use until it is similarly worn away.

I claim as my invention—

1. A stone-saw comprising a blade having a series of recesses in the edge of the same and teeth formed between said recesses, each of said teeth projecting in a curved line from the sides of said recesses alternately on opposite sides of the blade, substantially as described.

2. A stone-saw comprising a blade having a plane body portion and an edge portion provided with curved projections formed on opposite sides of the same, said edge portion having also a series of recesses whereby teeth are formed, said curved projections springing from the plane portion of the blade, substantially as and for the purpose set forth.

In testimony whereof I have signed my name to this specification in the presence of two subscribing witnesses.

JAMES PECKOVER.

Witnesses:
CARRIE O'BRIEN,
REBECCA O'BRIEN.